Patented Nov. 2, 1926.

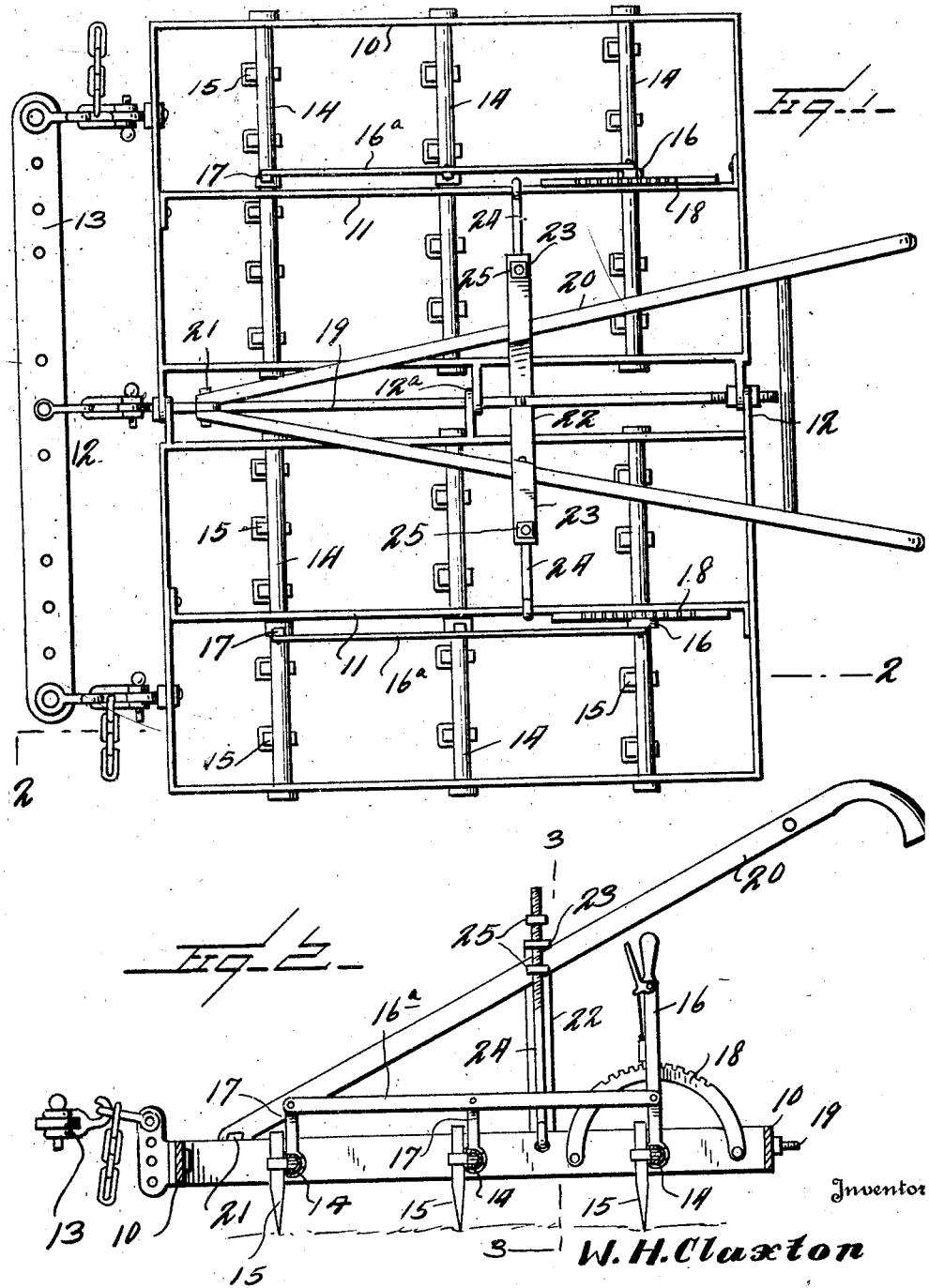

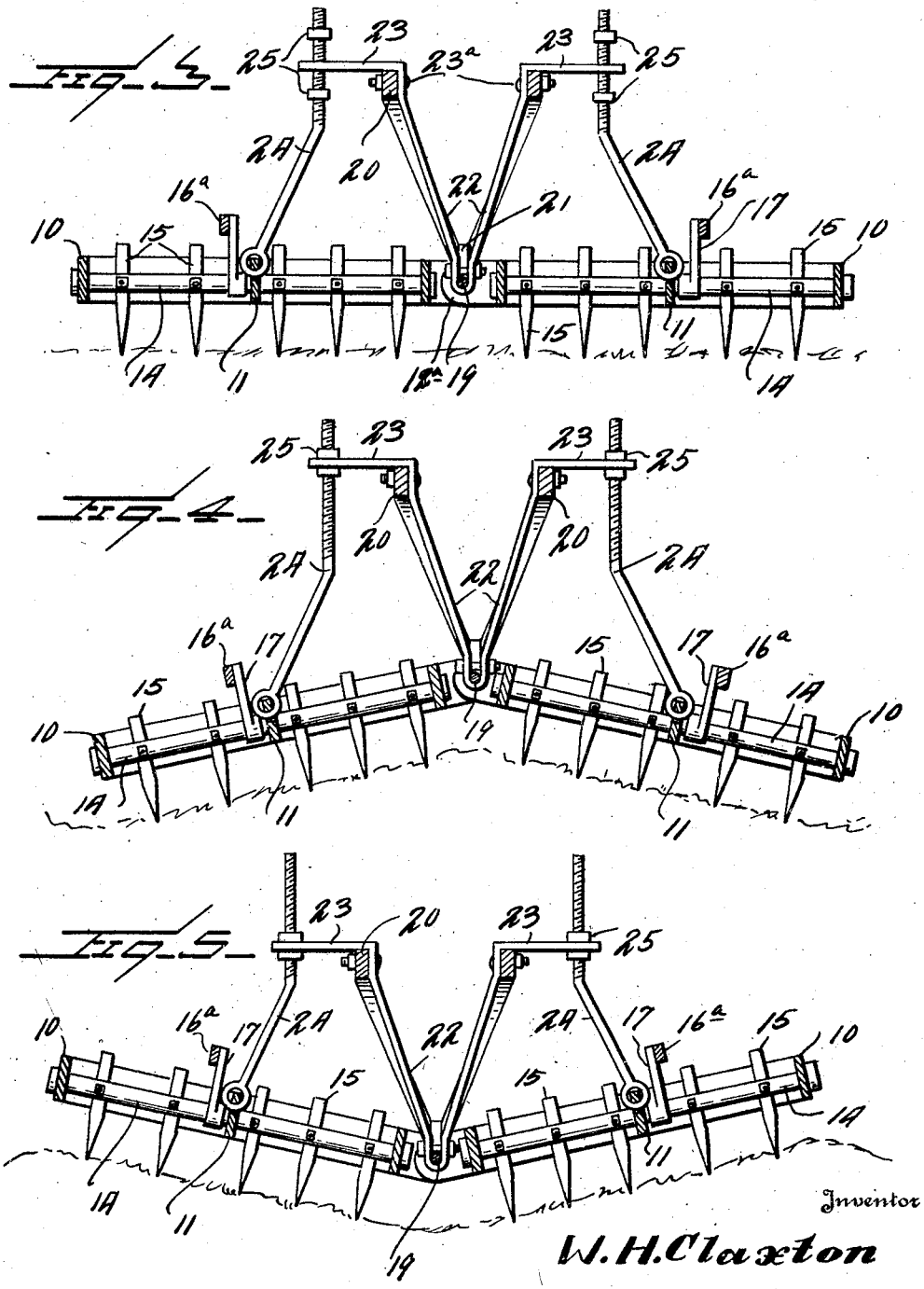

1,605,709

UNITED STATES PATENT OFFICE.

WILLIS H. CLAXTON, OF STANTON, TENNESSEE.

HARROW.

Application filed February 4, 1926. Serial No. 86,008.

This invention relates to harrows and particularly to that class of harrow formed in two sections hinged together so that the sections may be disposed in angular relation to each other or in the same plane.

The main object of the present invention is to provide a harrow which is hinged in the center so that it can be used on top of a hill or row and hug both sides of the row to thereby make a seed bed for planting or which can be used in the middle between rows or in a furrow and cultivate both sides of the rows or hills.

A further object is to provide a harrow of this character of very simple construction, which can be readily adjusted and guided and in which the harrow teeth are mounted for oscillation to thereby control the angle which the teeth bear to the ground.

Other objects will appear in the course of the following description.

My invention is illustrated in the accompanying drawings, wherein:—

Figure 1 is a top plan view of a harrow constructed in accordance with my invention;

Figure 2 is a longitudinal sectional view thereof;

Figure 3 is a front elevation of the harrow disposed in a horizontal plane;

Figures 4 and 5 are like views to Figure 3 with the harrow sections disposed in angular relation.

Referring to these drawings it will be seen that the harrow consists of two sections, each section comprising a rectangular frame, designated 10, preferably formed of strap iron about two inches wide and of any desired thickness. Each of these frames support a longitudinally extending bar 11 attached at its ends to the ends of the section in any suitable manner as by rivets, bolts or the like. Each of these sections is formed on its inner side with lugs 12 which overlap as illustrated, and attached to both of these sections at the forward ends thereof, is a hitch bar designated 13, which is preferably connected by clevises and draft chains to these two sections.

Oscillatably mounted in the longitudinal bars of each frame and the longitudinal bar 11 are the tooth carrying bars 14 which may be of any suitable construction but are shown as semi-circular in cross section, these being oscillatably mounted in the bars of the frame and carrying the harrow teeth 15. For oscillating these tooth carrying bars and holding them in oscillated position I provide the levers 16 pivoted upon the longitudinal bars 11 at the rear ends thereof and having links 16a pivotally connected thereto, and pivotally connected to arms 17 extending from the several tooth carrying bars. These levers operate adjacent the toothed sector 18, each lever being provided with any suitable locking means engaging the toothed sector and holding the lever in desired position. By this means the several tooth carrying bars may be adjusted to carry all of the teeth of the section into any desired angular relation to the ground. Preferably there are lugs 12a disposed midway between the rear ends of the harrow sections and through the lugs 12 and 12a passes a rod 19 constituting a pivot or hinge upon which these sections may oscillate and as a connecting means between the sections, this rod being provided at its forward end with a flexible connection and the hitch bar 13.

Disposed with their lower ends between the adjacent longitudinal bars 10 of the two sections are the downwardly convergent handles 20. These handles at their lower ends are bolted or otherwise connected to the rod 19 as at 21, and the handles being suitably braced from each other. Engaging beneath the rod 19 and bolted or otherwise connected thereto, is a yoke 22 having upwardly and outwardly diverging arms, these arms at their extremities being angularly bent at 23. A bolt 23a passes through the upwardly diverging arms and through the handle bars 20. Links 24 are flexibly connected to the angular ends 23 preferably by means of nuts 25 disposed on each side of the angular extremity 23, the links having a relatively large screw thread for engagement by these nuts. The other extremity of the link is hooked and engaged with the middle bar 11 of the corresponding section. Inasmuch as there are two nuts 25 disposed on each side of the angular extremity 23 it follows that the link 24 will not only act to lift up on the section but to hold the section down to its work. If it be desired to set a section at an upwardly and outwardly inclined angle the lower nut 25 is turned up while the upper nut 25 is turned off and thus the rods 24 will pull up on the section and one section will be held in angular relation to the other section and the harrow will be in condition for use between hills or elevated rows. If, on the other hand, it be desired to cultivate on the top and sides of a longitudinally extending hill or row, the nuts 25 are turned as to force the section downward from a horizontal plane. Thus it will be seen that this harrow can be used on top of a longitudinally extending hill and that its two sections extending downward over the sides of the hill may be used in a furrow, with the two sections extending upward. Furthermore, it will be seen that one section might be disposed entirely in a horizontal plane while the other section may be raised to or lowered to an inclined plane or that both sections may be disposed in a horizontal plane or that, assuming that the nuts 25 are adjusted away from each other it will be obvious that the two sections of the harrow will be flexibly connected to each other in such manner as to permit the sections to float over the ground and conform automatically to the surface thereof. This harrow is very simple, can be cheaply made and in actual practice has been found to do very effective work.

I claim:—

1. A harrow of the character described formed in two sections, each section comprising a rectangular frame and longitudinal braces, transversely extending tooth bars mounted in said frame, a longitudinally extended pintle to which the adjacent sides of the sections are operatively pivoted whereby the sections may be swung into the same plane or into angular relation to each other upwardly and rearwardly diverging handles pivotally connected to the pintle adjacent the forward end of the pintle, a yoke embracing the pintle and having upwardly and outwardly diverging portions with which the handles are respectively connected, and means carried by the yoke whereby the two sections of the harrow may be adjusted into or out of the same plane and held in this adjusted position.

2. A harrow of the character described comprising two sections and a longitudinally extending intermediate pintle to which the sections are operatively pivoted, whereby the sections may be swung into the same plane or into angular relation to each other, tooth bars carried by each section and having teeth, downwardly convergent handles having their lower ends operatively connected to said pintle, a yoke having divergent arms operatively connected at its yoke end to said pintle and having its upper ends bolted to the handles, each arm having a laterally projecting angular portion, and a link connected to each section, the links extending upward and inward and passing through said angular portion, and having adjusting nuts on each side thereof.

In testimony whereof I hereunto affix my signature.

WILLIS H. CLAXTON.